(12) United States Patent
Osheter

(10) Patent No.: US 10,103,888 B2
(45) Date of Patent: Oct. 16, 2018

(54) METHOD OF PERFORMING KEYED-HASH MESSAGE AUTHENTICATION CODE (HMAC) USING MULTI-PARTY COMPUTATION WITHOUT BOOLEAN GATES

(71) Applicant: Dyadic Security Ltd., Petah Tiqva (IL)

(72) Inventor: Valery Osheter, Ashdod (IL)

(73) Assignee: DYADIC SECURITY LTD., Petah Tiqva (IL)

( * ) Notice: Subject to any disclaimer, the term of this patent is extended or adjusted under 35 U.S.C. 154(b) by 0 days.

(21) Appl. No.: 15/610,239

(22) Filed: May 31, 2017

(65) Prior Publication Data
US 2017/0272251 A1 Sep. 21, 2017

Related U.S. Application Data

(63) Continuation of application No. PCT/IL2016/051242, filed on Nov. 20, 2016.
(Continued)

(51) Int. Cl.
*H04L 29/06* (2006.01)
*H04L 9/32* (2006.01)

(52) U.S. Cl.
CPC .......... *H04L 9/3242* (2013.01); *H04L 63/061* (2013.01); *H04L 63/062* (2013.01); *H04L 63/0876* (2013.01)

(58) Field of Classification Search
CPC ... H04L 9/3242; H04L 9/3236; H04L 9/0643; H04L 2209/80
See application file for complete search history.

(56) References Cited

U.S. PATENT DOCUMENTS

2002/0191791 A1    12/2002  Anand
2005/0005098 A1*    1/2005  Michaelis ............... G06F 21/51
                                                         713/156
(Continued)

FOREIGN PATENT DOCUMENTS

WO    WO 2015166216 A1    11/2015

OTHER PUBLICATIONS

Demmler, Hardware-Assisted Two-Party Secure Computation on Mobile Devices, Jul. 2013, Technische Universität Darmstadt, 175 Pages (Year: 2013).*
(Continued)

*Primary Examiner* — Farid Homayounmehr
*Assistant Examiner* — Christopher C Harris
(74) *Attorney, Agent, or Firm* — McAndrews, Held & Malloy, Ltd.

(57) ABSTRACT

The subject matter discloses a method operated on at least two servers for a third-party client, the method comprising receiving by a first server a first result of the first irreversible function applied to a secret key from a first third-party client, receiving by a second server a second result of the second irreversible function applied to the secret key from the third-party client, receiving by the first server, a message from a second third-party client, the first server computing a first hash function on said first result and on said message, and sending a result of the first hash function from the first server to the second server, the second server computing a second hash function on said second result and on the result of the first hash function sent from first server and outputting the result generated by second server as HMAC result.

10 Claims, 3 Drawing Sheets

Related U.S. Application Data

(60) Provisional application No. 62/258,479, filed on Nov. 22, 2015.

(56) References Cited

U.S. PATENT DOCUMENTS

| | | | |
|---|---|---|---|
| 2005/0108533 A1* | 5/2005 | Ji | G06Q 20/3672 713/171 |
| 2007/0294537 A1* | 12/2007 | Peyravian | H04L 9/3242 713/178 |
| 2013/0227274 A1* | 8/2013 | Di Crescenzo | H04L 63/062 713/153 |
| 2014/0064483 A1* | 3/2014 | Fujisaki | H04L 9/3242 380/44 |
| 2015/0074403 A1 | 3/2015 | Perez | |
| 2015/0098563 A1* | 4/2015 | Gulley | H04L 9/0643 380/28 |
| 2015/0163207 A1 | 6/2015 | Ho | |
| 2015/0349958 A1* | 12/2015 | Lindell | H04L 9/085 713/168 |
| 2016/0087791 A1 | 3/2016 | Campbell | |
| 2016/0294550 A1* | 10/2016 | French | H04L 9/00 |
| 2016/0350861 A1* | 12/2016 | Loughlin-McHugh | G06Q 40/06 |
| 2017/0126410 A1* | 5/2017 | Maximov | H04L 9/3242 |

OTHER PUBLICATIONS

Riva, Efficient Cryptographic Protocols: Secure Two-Party Computation and Refereed Delegation of Computation, Nov. 2013, Senate of Tel Aviv University, 136 Pages (Year: 2013).*

PCT, Written Opinion of the International Searching Authority, International application No. PCT/IL2016/051242, dated Mar. 1, 2017 (5 pages).

PCT, International Search Report, International application No. PCT/IL2016/051242, dated Mar. 1, 2017 (7 pages).

"The cloud proxy tao for trusted computing." University of Califronia at Berkeley, Berkeley, California, USA, Tech. Rep. UCB/EECS-2013-135 (2013). (Retrieved on Feb. 23, 2017). Retrieved from the internet:<https://www.cs.cornell.edu/fbs/publications/CloudProxyTR.pdf> Manferdelli, J. et al. Jul. 19, 2013 (Jul. 19, 2013) section 4.1 (22 pages).

* cited by examiner

METHOD OF PERFORMING KEYED-HASH MESSAGE AUTHENTICATION CODE (HMAC) USING MULTI-PARTY COMPUTATION WITHOUT BOOLEAN GATES

This application is a continuation of International Application No. PCT/IL2016/051242, filed on Nov. 20, 2016, and claims the benefit of U.S. Provisional Patent Application No. 62/258,479, filed on Nov. 22, 2015, the entireties of which are herein incorporated by reference.

FIELD OF THE INVENTION

The present invention generally relates to the field of network security and authentication process. More particularly, the present invention relates to the field of utilizing HMAC methods for securing authentication processes.

BACKGROUND OF THE INVENTION

In cryptography, a keyed-hash message authentication code (HMAC) is a specific construction for calculating a message authentication code (MAC) involving a cryptographic hash function in combination with a secret cryptographic key. The definition of HMAC is as follows:

$$HMAC(K,m) = H((K \oplus opad) \| H((K \oplus ipad) \| m))$$

where
H is a cryptographic hash function.
K is a secret key padded to the right with extra zeroes to the input block size of the hash function, or the hash of the original key if it is longer than that block size.
m is the message to be authenticated,
$\|$ denotes concatenation,
$\oplus$ denotes exclusive or (XOR),
opad is the outer padding (0x5c5c5c . . . 5c5c, one-block-long hexadecimal constant), and ipad is the inner padding (0x363636 . . . 3636, one-block-long hexadecimal constant).

HMAC is defined to be performed on a single machine with the full key in memory. HMAC may also be performed on two or more computerized entities, using Secure Multi-Party Computation (MPC), for example in order to authenticate passwords, such as one-time passwords, but can also be used for other purposes. MPC is used when none of the parties holds the entire encryption key and the encryption key is shared between the parties. Standard implementations of HMAC performed in multi-party computation requires representing the HMAC function as a Boolean circuit and securely computing many Boolean gates, which requires transferring a relatively large amount of data between the parties. When one of the parties is a limited in computing resources, such as a mobile phone, using Boolean gates makes the process slow and may interfere with the normal operation of the mobile phone.

SUMMARY OF THE INVENTION

The present invention discloses a method and system of performing HMAC using at least two computerized servers in which none of the servers holds the entire HMAC encryption key. The process of computing the HMAC may be used to validate the authenticity of a third-party client seeking to connect or communicate with a computerized entity on a computer network. Such a network may be the internet, a local area network, a wide area network, and the like. The method disclosed in the present invention may be initiated by a third-party client by choosing or generating a secret key for the HMAC process and then performing two compression processes on the secret key with two different irreversible functions (defined by the irreversible function in the HMAC hash function and the ipad/opad constants). The third-party client can then send the secret key compressed using the first irreversible function to a server denoted as the first server and the secret key compressed with the second irreversible function to a server denoted as the second server. The client then deletes the secret key and the results of irreversible functions from the storage, the memory or/and from another readable media integrated with said third-party device.

In order to compute the HMAC function, a third-party client sends a message to the servers in order for the servers to calculate the HMAC value on that message. In some cases, the message may be a computer usable content which can be sent and used between computerized devices. For example, the third-party device may send a character string, a long number, a time-stamp, digital image, a photo, and the like, as a message.

Upon receiving the message from the third-party device, the first server utilizes a first hash function to hash the secret key compressed using the first irreversible function and the message, and then sends the value of the first hash function to the second server. Then, upon receiving the value of the first hash function, the second server computes a second hash function applied on the value of the first hash function and the secret key compressed using the second irreversible function. The result of the second hash function is the standard HMAC computation. In some cases, all hash functions utilized by the authentication servers may be identical. In some other cases, some of the hash functions may be identical and some of them not.

The subject matter also discloses a system comprised of at least two servers capable of receiving and storing compressed secret keys and messages sent from a third-party client. At least two of the servers may comprise processing modules configured to execute hash functions on the compressed secret keys and on the message. The servers may also comprise a concatenating module which can concatenate the hash function results and complete the HMAC computing and approve the authentication processes. The servers of the system can also be configured to deny any access between them. For example, a person or a process operated on one of the server cannot access the HMAC encryption keys, or any other information located in the other server.

The third-party client seeking to authenticate with the system disclosed in the present invention may be a computerized device such as a mobile computerized device, a personal computer, a tablet personal computer, laptop, desktop, and the like.

BRIEF DESCRIPTION OF THE FIGURES

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DESCRIPTION OF THE INVENTION

Figure 1:
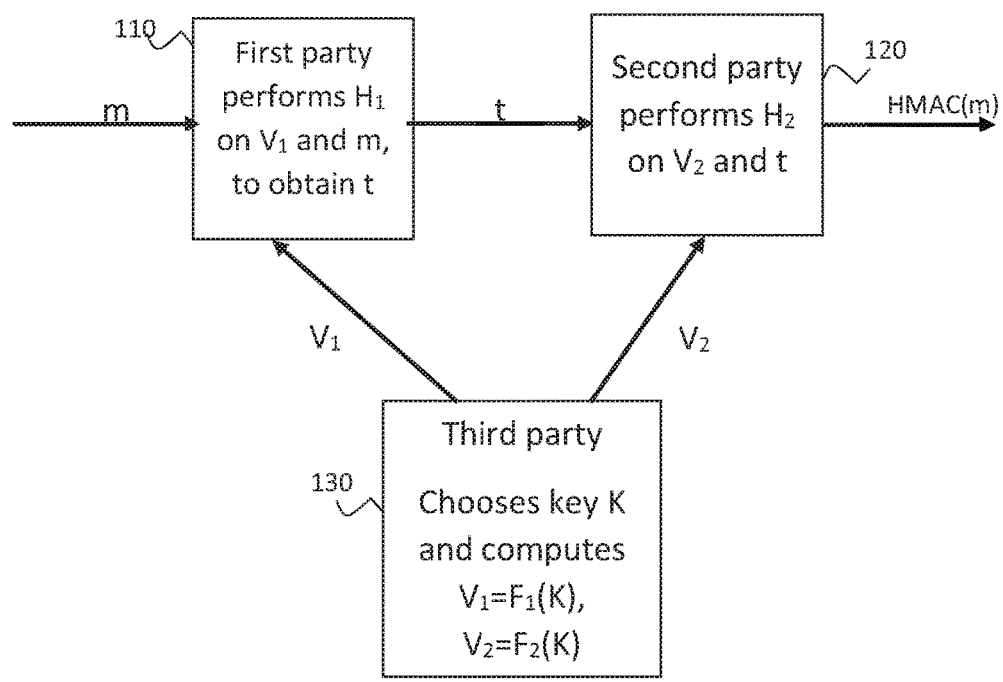
FIG. 1 shows a schematic computerized environment for performing the HMAC method with two parties nominated as servers, in accordance with exemplary embodiments of the subject matter.

The present invention discloses a method and system of performing an authentication process based on HMAC using two or more computerized servers in which none one of the servers holds the entire HMAC secret key provided by a third-party client. The secret key is divided at the third-party client by different compression functions and provided to the different servers. Thus, the existence of the divided key in more than one server, divided by applying different compression functions, makes the step of utilizing an MPC requiring a representation of the HMAC function in a Boolean circuit unnecessary. The disclosed method allows utilization of diverse computerized devices which can be configured as authentication servers. For example, a server and a client, two PCs, a computer and a mobile device. In some cases, such computerized systems may be operated on computerized devices such as a smartphone and/or additional computerized devices such as tablets, laptops and the like.

At first, a secret key K for computing HMAC is selected or generated by a third-party client. Then, two values of the key are computed, as follows: One party, nominated as the first server, receives a value that is an output of a first compression function applied on K, and the other party, nominated as the second server, receives an output of a second compression function applied on K. In some cases, the key K may be padded by an extra constant number to the input block size of the function. In such cases, the K sent to the first authentication server may be padded with one constant number (represented as ipad) and the K sent to the second party may be padded with a different constant number (represented as opad). Both compression functions may be selected from the standard compression function used in the hash function used in standard HMAC (in which case the result is a standard HMAC computation).

In some cases, both compression functions can be irreversible functions and in some cases, behave as pseudorandom functions. The parties which may be involved in the HMAC calculation cannot extract the key neither from $F_1(K)=F\ [K\ XOR\ ipad]$ alone, nor from $F_2(K)=F\ [K\ XOR\ opad]$ alone, where F represents the compression function, $F_1$ represents the first compression function, $F_2$ represents the second compression function, and K represents the secret HMAC key. At the method disclosed in the present invention, the next phase is defined when the first entity receives the value resulted of $F_1(K)$ and the second entity receives the value resulted of $F_2(K)$. The entity may be a server, mobile device, PC, and so on. In possible embodiments of the present invention, once the second party has received the value resulted of $F_2(K)$, an authentication process may take place. Thus, a third-party client seeking to authenticate may send a message to the first party. Then, after the message is received, the first party can compute a hash function on the output of $F_1(K)$ and M such as $F[F_1(K)+M]$, where M represents the message. In some cases, the message M may be a moving factor or the current time in case the HMAC is used for one-time password authentication, or can be another message as desired by a person skilled in the art. When using a moving factor, whenever a new OTP is generated, the moving factor will be incremented, hence the subsequently generated passwords should be different each time.

In some embodiments of the present invention, the hash function performed by the first party may also use the compression function, as follows: $H_1(F_1, M)=F(F_1(K)+M)$ in which the output of the hash function is the output of the compression function F applied on the value outputted from $F_1$ concatenated with the output of the compression function F applied on the value M (the message). In some cases, $H_1(F_1, M)$ also includes compression on the length of M, the message.

After calculating $H_1$, the first entity sends the value resulted of $H_1$ to the second entity which can calculate $H_2$ by applying a hash function on the value $H_1$ and the value outputted from $F_2$. The second entity may perform the hash function as follows: $H_2\ (F_2, H_1)=F(F_2(K)+H_1)$. The hash function results calculated by the second entity can yield a standard HMAC computation, and thus this constitutes an MPC computation of HMAC without revealing the secret HMAC key to either of the parties.

In some cases, the hash function performed by the first party can be performed in an iterative manner, for example in case the size of the message M is larger than a block size for the hash algorithm. In such a case, the message is divided to two or more sections in the size of the algorithm block, and the hash function is performed as follows:

$$H(T)=h(h(h(IV,T_0),T_1),\ \ldots\ ),\text{length})$$

Where T represent the input of the hash algorithm H, h represents the hash algorithm (compression function) applied on blocks of input T in a constant block size, $T_0$, $T_1$, $T_2$ ... represent sections of message M in a constant size and IV is a constant value. In some cases, the value T may be the message M and the sequenced $T_0$, $T_1$, $T_2$ and on may represent sections in constant block size of said message M. For example, in case the message M is required to be hashed with an algorithm H, while algorithm H is defined to hash blocks in a constant size, and M is larger than the size of one block, the M message can be divided into a number of sections where each section is the at the size of the constant block size the algorithm H is defined to hash. In such cases, the first-hash-h is performed on a constant IV and the first section. Then, the second-hash-h is performed on the result of the first-hash-h and the second section. The third-hash-h is performed on the result of the second-hash-h and the third section, until the last section, which may define the message length.

The hash function may be any hash function desired by a person skilled in the art, such as SHA-1, MD5, SHA-2, SHA-3 and others.

FIG. 1 shows a schematic computerized environment for performing the HMAC method with two parties nominated as servers, in accordance with exemplary embodiments of the subject matter. The environment comprises two parties, first party 110 which may be the first server, a second party 120 which may be the second server, and a third party client 130. The first party 110 and the second party 120 perform together one HMAC method without accessing the full secret key. The third-party client 130 chooses a secret key, computes two different irreversible functions on the encryption key and sends a result of the first irreversible function computation to the first party 110 and a result of the second irreversible function computation to the second party 120. The third-party client 130 performs $F_1(K)$ and $F_2(K)$ as $V_1$ denotes the output of $F_1(K)$ and $V_2$ denotes the output of $F_2(K)$. Typically, the third party is only used in the phase of generating and exchanging the secret keys with first party 110 and second party 120, before performing the hash functions. The third party can also be configured to automatically erase the information associated with the HMAC after applying the functions on the encryption key K.

One party, either the first party 110 or the second party 120, performs the hash function on the message and the value V1 previously received from the third party 130. Then, the party that applied the hash function on the value V1 sends the result of the hash function to the other party. For example, the first party 110 calculates the hash function on the message M and the value $V_1$, and sends the result of the hash function to the second party 120. Then, the second party 120 applies a second hash function on the result received from the second party 120 and on the value $V_2$. It should be noted that a hash function is performed on at least two elements. The result of the second hash function, performed at the second party 120, is the result of the HMAC method and can be used to authenticate a client (e.g., when generating a one-time password) or for authenticating a message (e.g., when computing HMAC for the purpose of message authentication). In some cases, the method is implemented between a server and a mobile device as the first party 110 and the second party 120, respectively, and the user of the mobile device, such as a smartphone, wishes to authenticate a one-time password using HMAC. In such an exemplary case, the smartphone performs the second hash function and sends the result to the server in order to authenticate the password.

Figure 2:
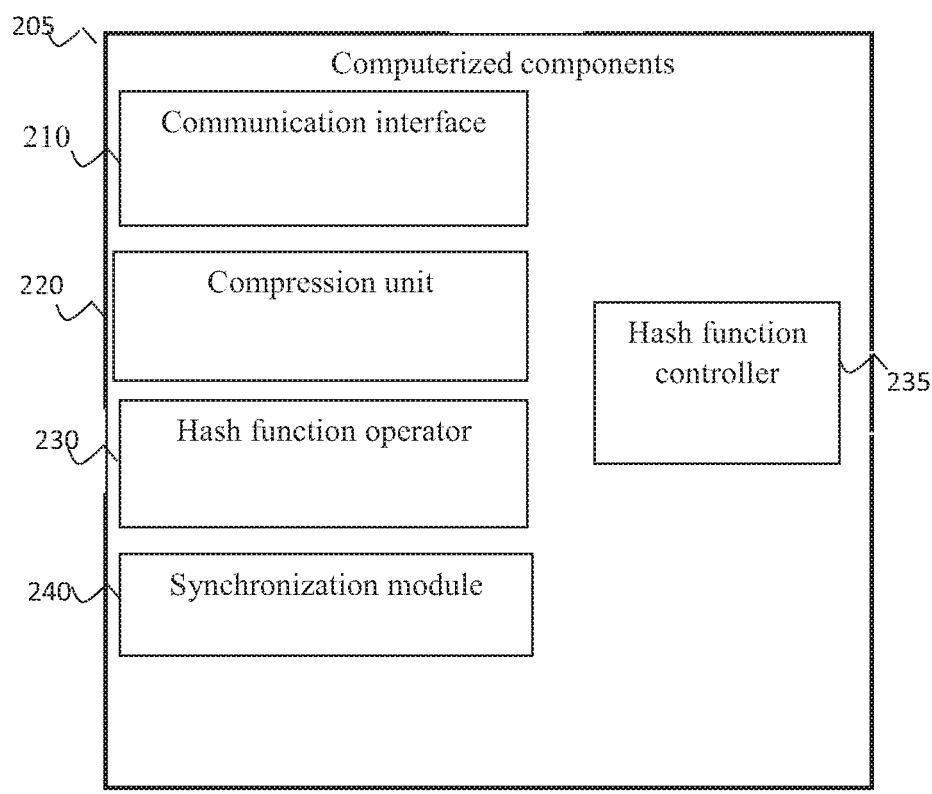
FIG. 2 shows a schematic computerized system for performing the HMAC method without Boolean gates, in accordance with exemplary embodiments of the subject matter.

FIG. 2 shows a schematic computerized system for performing the HMAC method without Boolean gates, in accordance with exemplary embodiments of the subject matter. The computerized system 205 may reside in either the first party or the second party which performs the HMAC method using a multi-party computation.

The computerized system 205 comprises a communication interface 210 configured to communicate with other parties. For example, the communication interface 210 receives the value of the irreversible function applied on the encryption key at the third party. The communication interface 210 also transmits and receives the value of the first hash function applied by one of the parties. For example, in case the first party performs the first hash, the communication interface 210 of the first party sends the result of the first hash to the second party which performs the second hash on the result of the first hash.

The computerized system 205 comprises a compression unit 220 configured to compute the compression function as part of the hash function process. The compression unit 220 uses a compression method stored in a memory storage of the computerized system. The compression method performed by the compression unit 220 may be selected by a person skilled in the art.

The computerized system 205 comprises a hash function operator 230 configured to perform hash functions on two or more values. The values may be transmitted to the hash function operator 230 via a processing unit of the computerized system, for example via a register. The hash function operator 230 may use the compression unit 220 when performing the hash function, by sending a value to the compression unit 220, receiving a compressed value and accumulating the compressed values.

The computerized system 205 also comprises a hash function controller 235 configured to control the operation of the hash function operator 230. For example, the hash function controller 235 may inject two values to the hash function operator 230, determine how to divide the message M according to the block size of the hash method, reiterate the hash function performed by the hash function operator 230 and verify that the hash is performed correctly. In some cases, at least some of the compression unit 220, hash function operator 230 and hash function controller 235 are components of a processing module in the first authentication server 110 or the second authentication server 120.

The computerized system 205 comprises a synchronization module 240 configured to synchronize the values in the first party and the second party. That is, when an encryption algorithm such as AES method is applied on the passwords authenticated using the HMAC method in multi-party computation. The synchronization module 240 verifies that the password is updated, and prevents an attacker who copied the information in the first party to access information stored in the second party, as the AES is updated frequently, for example once a minute.

Figure 3:
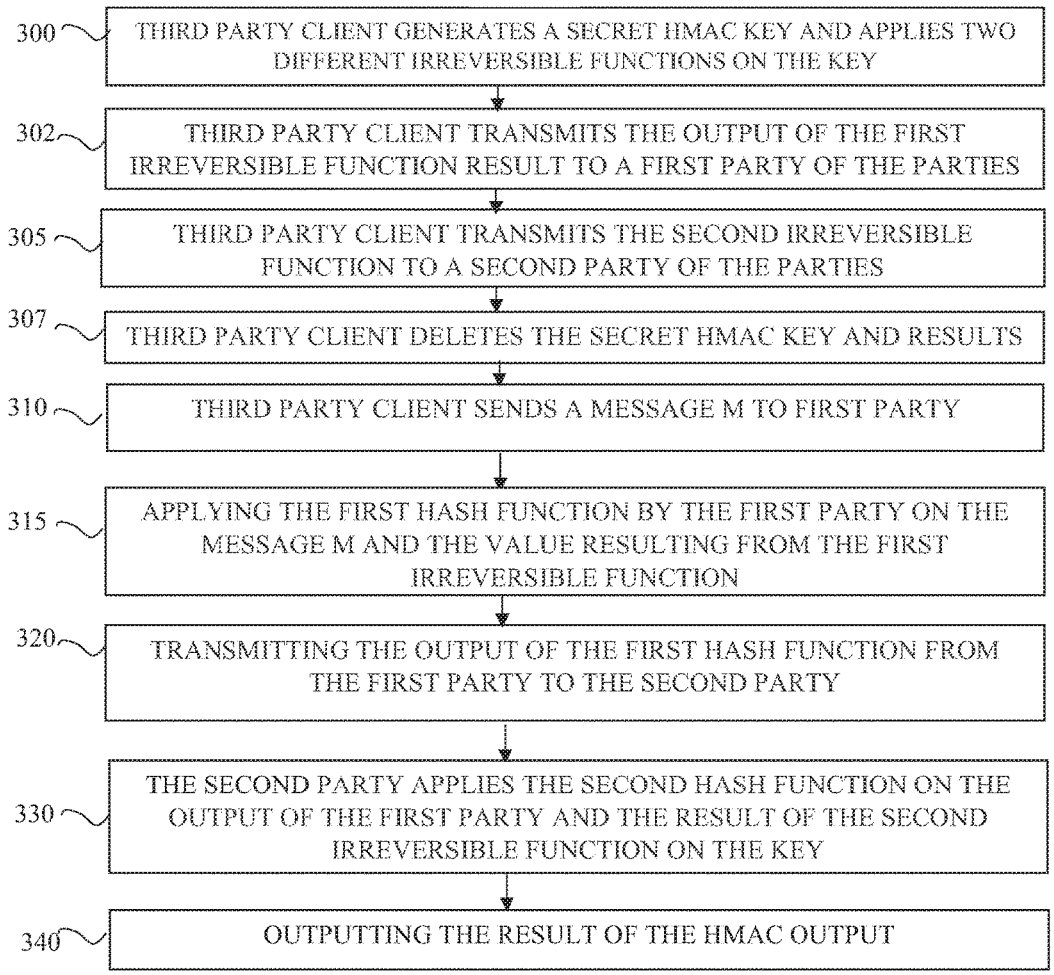
FIG. 3 shows a method for utilizing an HMAC method performed by two parties, for authenticating a third-party client, in accordance with exemplary embodiments of the subject matter.

FIG. 3 shows a method for utilizing an HMAC method performed by two parties, for authenticating a third-party client, in accordance with exemplary embodiments of the subject matter. In some cases, the authentication method may be used to validate the authenticity of a person utilize the third-party client. In some cases, the authentication method may be used to validate the authenticity of a person utilizing a specific device. For example, a user may utilize a computerized mobile phone in an authentication process. Thus, the user may be able to pass successfully the authentication process with one specific computerized mobile phone, and fail to authenticate when utilizing another computerized mobile phone. Step 300 may be defined as the setup phase wherein an HMAC key is generated by a third party. The third party may apply two different irreversible functions on the HMAC key and then may preserve the results.

Step 302 discloses transmitting the output of the first irreversible function to a first party client of the parties. Step 305 discloses transmitting the output of the second irreversible function to a second party of the parties. Step 307 is an optional step for the third-party client which can delete the encryption key and the results of the compressed function on the encryption key. Step 310 discloses receiving a message M for computing a new HMAC result. Such a message may be an ASCII string, a key, and the like. In some cases, the message itself may contain data which assures that this same message can only be sent once. Such data may be a time stamp, a sequence number, a moving factor, and the like. Step 315 discloses applying the first hash function by one of the parties. The first hash function is performed on the message M and the value resulting from the first irreversible function sent from the third-party client. Step 320 discloses transmitting the output of the first hash function from the first party to the second party, which can then perform the calculation of the second hash function.

Step 330 discloses performing the calculation of the second hash function, by the second party. The second hash function is performed on the output of the first hash function and uses the result of the second irreversible function. The output of the second hash function is the HMAC value which can be used for any HMAC purpose. One such purpose is for one-time password generation.

Step 340 discloses outputting the HMAC/one-time password for its desired purpose.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method operated on at least two servers for a third-party client, the method comprising:
   receiving by a first server, via a first communication interface, a first result of a first irreversible function applied to a secret key from a first third-party client over a computer network;
   receiving by a second server, via a second communication interface, a second result of a second irreversible function applied to the secret key from the first third-party client over the computer network;
   wherein the second server has no access to the first result of the first irreversible function and wherein the first server has no access to the second result of the second irreversible function;
   receiving by the first server, a message from a second third-party client;
   the first server computing, using a processor of the first server, a first hash function on said first result and on said message, and sending, via the first communication interface, a result of the first hash function from the first server to the second server;
   the second server computing, using a processor of the second server, a second hash function on said second result and on the result of the first hash function sent from the first server;
   outputting, by the second server, the result generated by the second server as an HMAC result;
   wherein:
   both the first server and the second server are required to compute the HMAC result;
   the first third-party client comprises an electronic device; and
   the second third-party client comprises an electronic device.

2. The method of claim 1, wherein the first third-party client is a different entity from the second third-party client.

3. The method of claim 1, wherein the first third-party client is the second third-party client.

4. The method of claim 1, further comprises deleting the secret key by the first third-party client after sending the results of the first irreversible function to the first server and the second irreversible function to the second server.

5. The method of claim 1, wherein the message is represented by a file readable by a computer.

6. The method of claim 1, wherein the first server has no access privileges to the second server.

7. The method of claim 1, wherein the second server has no access privileges to the first server.

8. The method of claim 1, wherein the result of the first irreversible function applied to the secret key by the first third-party client is stored by the first server.

9. The method of claim 1, wherein the result of the second irreversible function applied to the secret key by the first third-party client is stored by the second server.

10. The method of claim 1, wherein the first hash function and the second hash function are identical functions.

* * * * *